United States Patent
Odaohhara

(10) Patent No.: US 6,373,222 B2
(45) Date of Patent: Apr. 16, 2002

(54) POWER SUPPLY APPARATUS, ELECTRICAL EQUIPMENT AND POWER SUPPLY METHOD

(75) Inventor: Shigefumi Odaohhara, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/798,309

(22) Filed: Mar. 2, 2001

(30) Foreign Application Priority Data

Mar. 17, 2000 (JP) .......................................... 12-076882

(51) Int. Cl.$^7$ ............................................. H01M 10/46
(52) U.S. Cl. ..................................................... 320/116
(58) Field of Search ................................ 320/103, 116, 320/118, 121, 162, 163, 164

(56) References Cited

U.S. PATENT DOCUMENTS 5,903,131 A * 5/1999 Sekine et al. ............... 320/106

* cited by examiner

Primary Examiner—Edward H. Tso
(74) Attorney, Agent, or Firm—John B. Schelkopf

(57) ABSTRACT

The present invention relates to a power supply system, in particular, to a power supply apparatus and a power supply method that each use a high impedance battery used for electric equipment such as a notebook PC (notebook type personal computer).

Usually, electric power is supplied from a lithium polymer battery to a main body, and insufficient electric power is supplied from a main battery such as a lithium ion battery when a current over a certain amount is necessary. That is, there are included a lithium ion battery to supply electric power, a lithium polymer battery to output electric power in voltage higher than that of this lithium ion battery, and a current limiting circuit to supply electric power by this lithium polymer battery until load power reaches a predetermined amount and to limit an output from the lithium polymer battery when the load power exceeds the predetermined amount, in which electric power is supplied by the lithium ion battery and lithium polymer battery after current limitation.

15 Claims, 6 Drawing Sheets

[Figure 1]
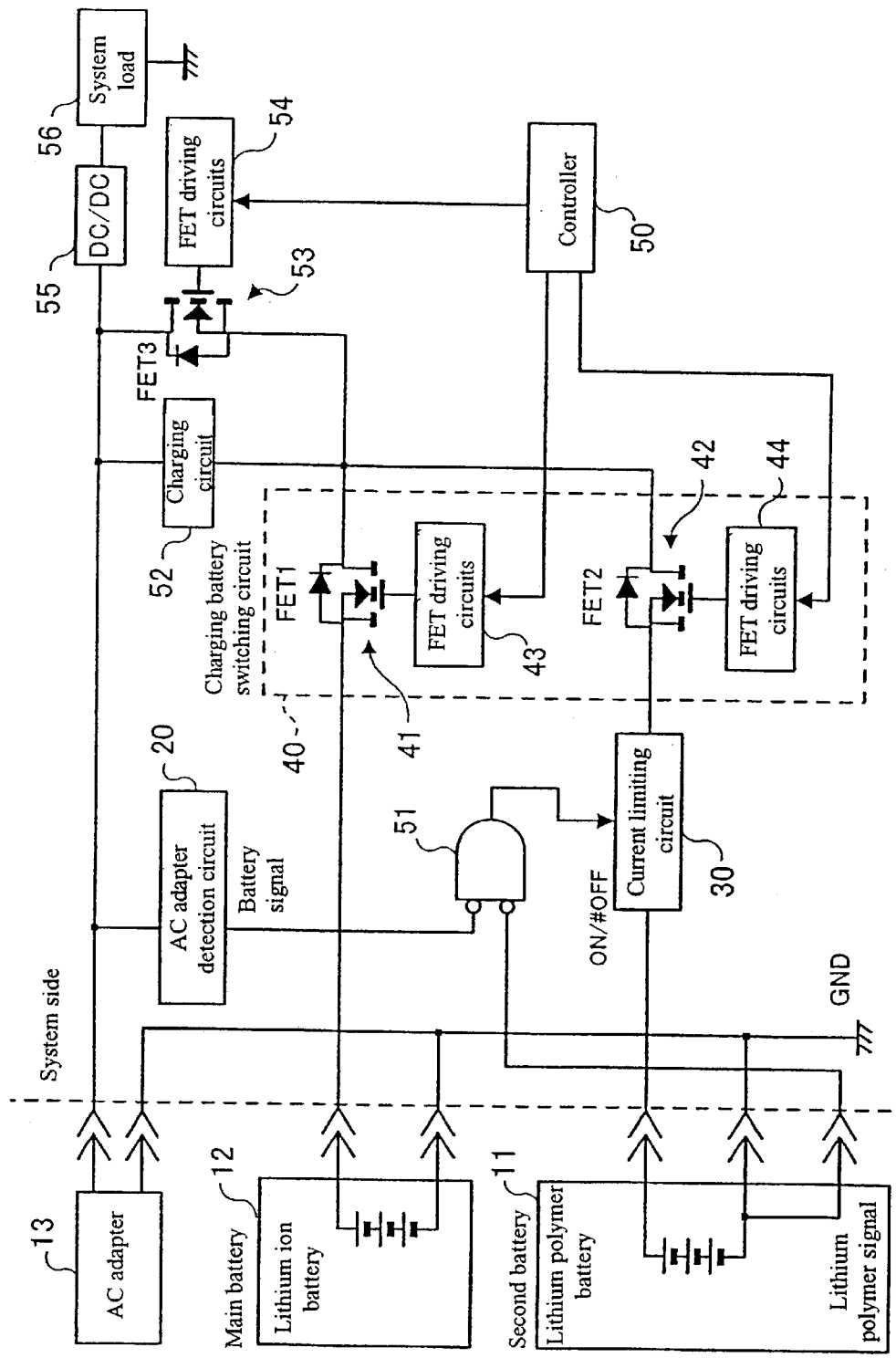

[Figure 2]
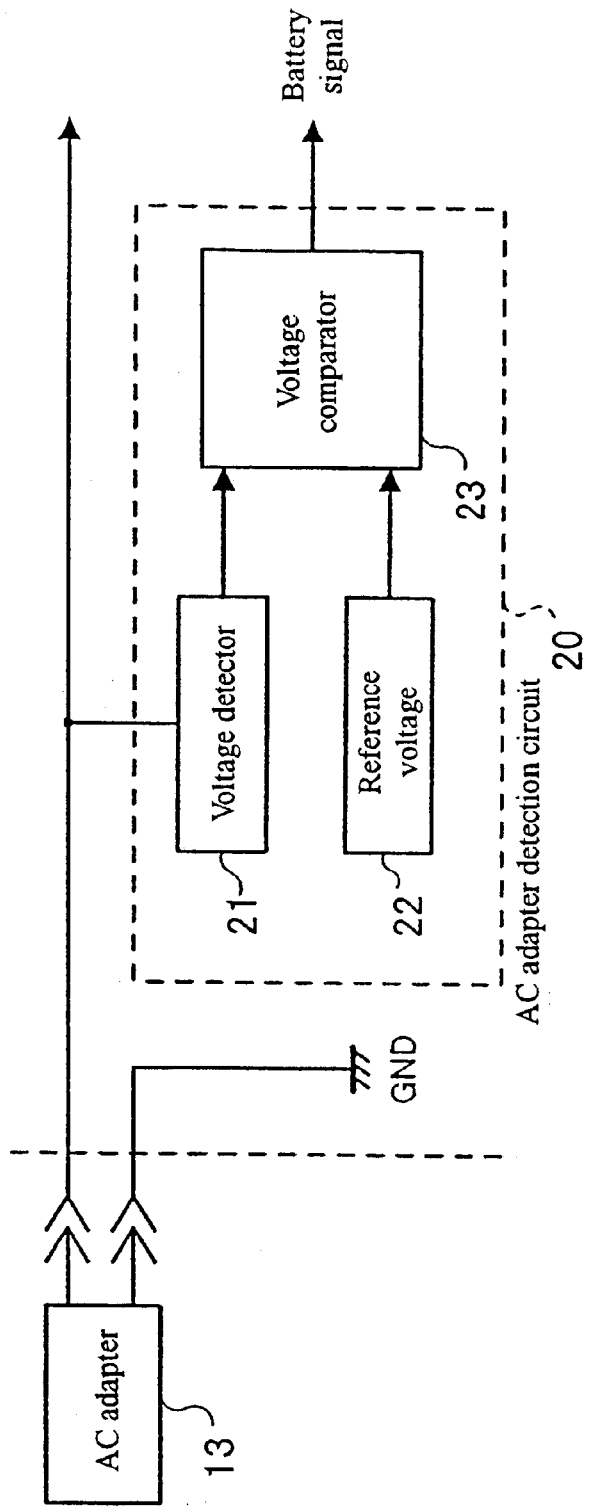

[Figure 3]
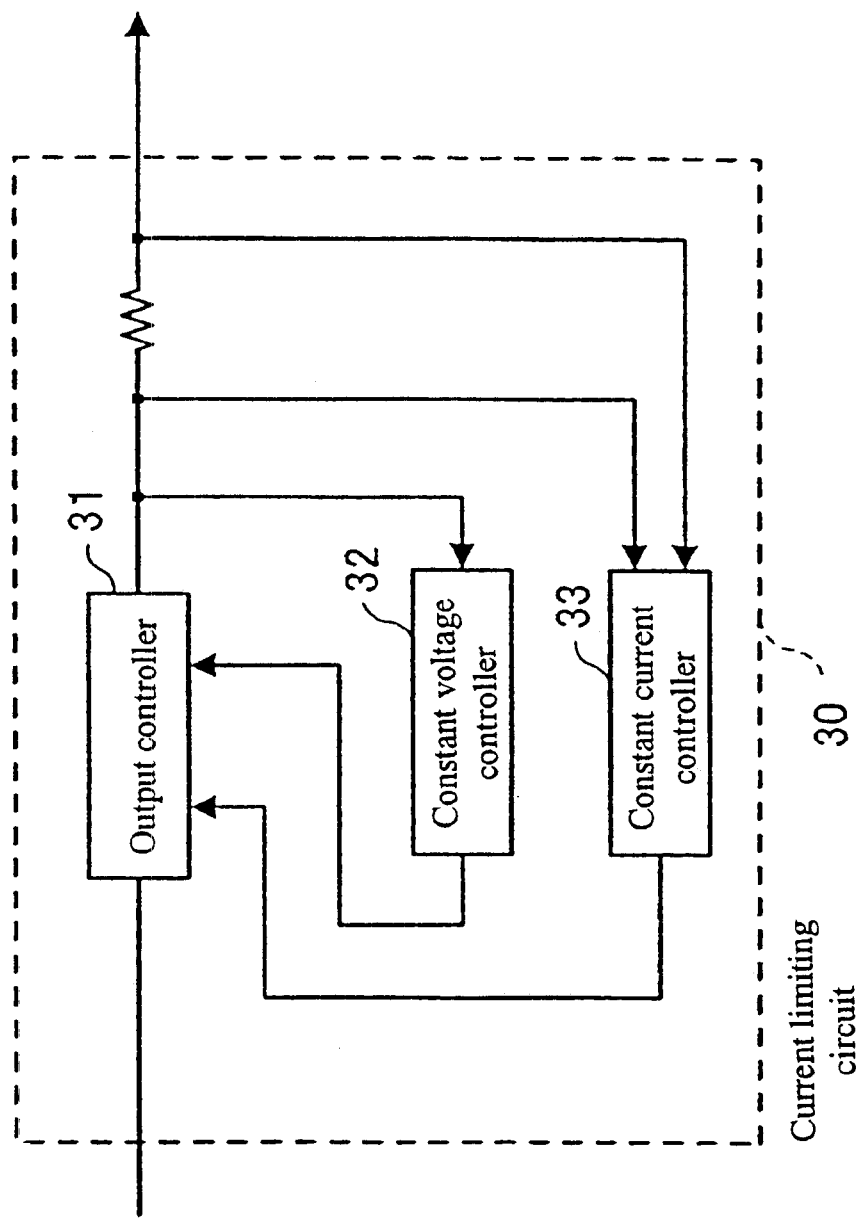

[Figure 4]
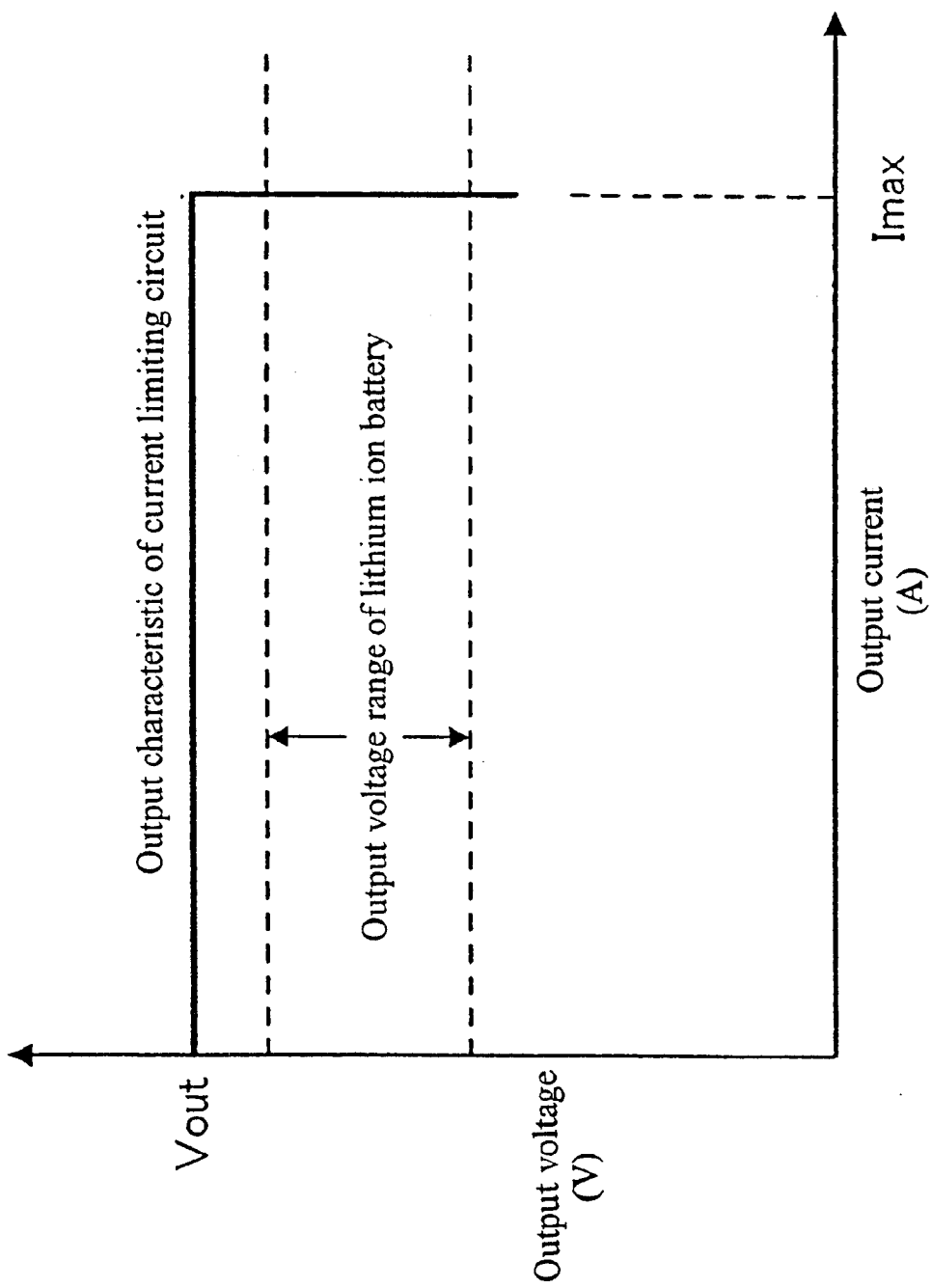

[Figure 5]
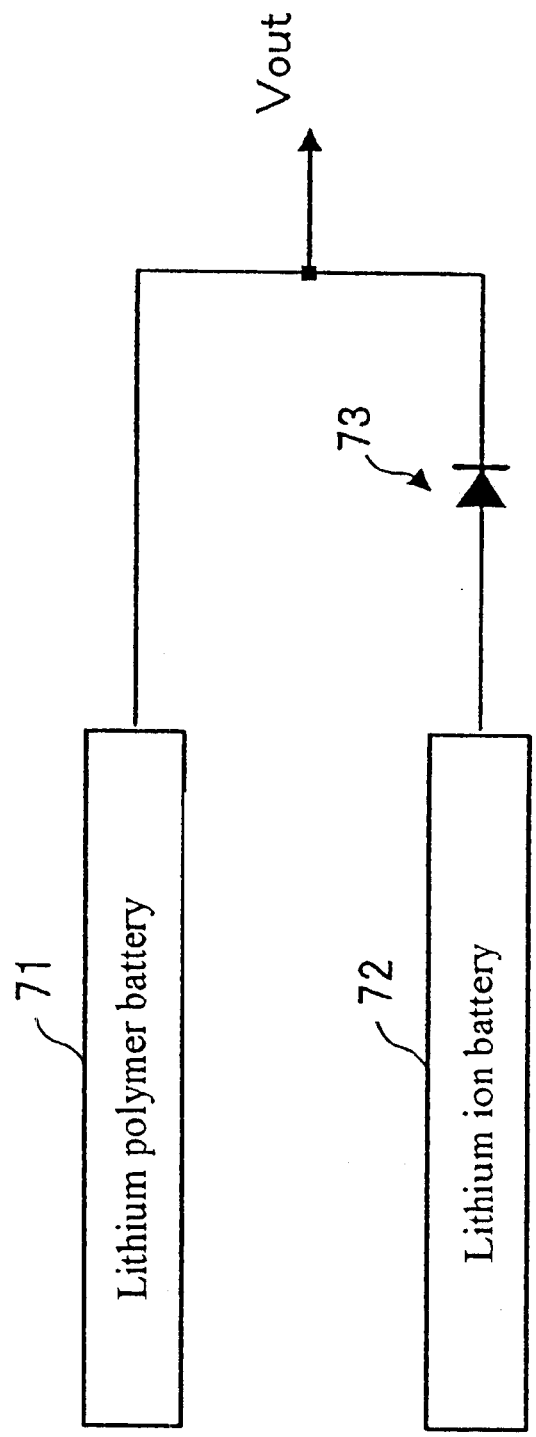

[Figure 6]
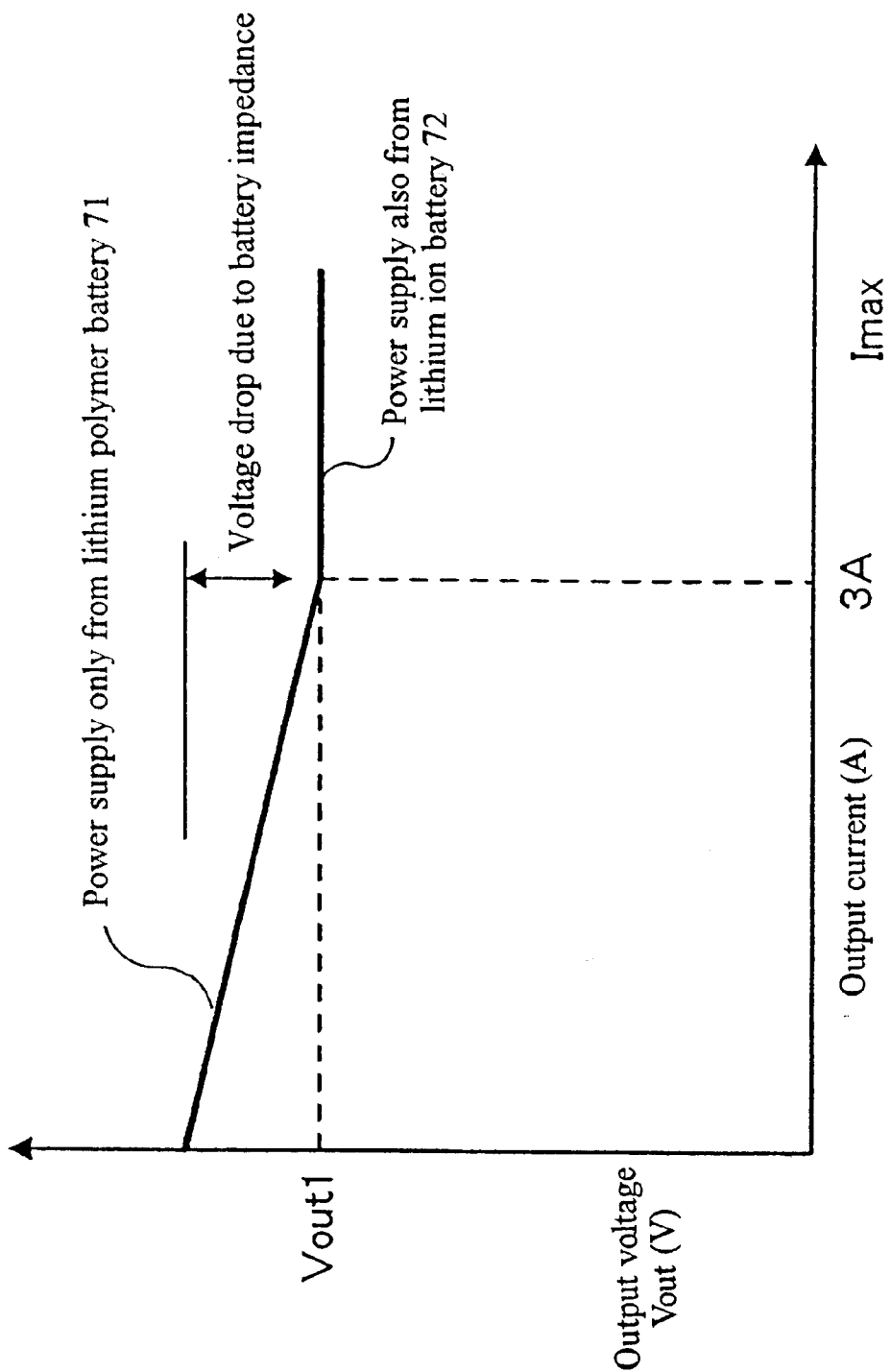

POWER SUPPLY APPARATUS, ELECTRICAL EQUIPMENT AND POWER SUPPLY METHOD

BACKGROUND OF THE INVENTION

1. Field of the Invention

The present invention relates to a power supply system, in particular, to a power supply apparatus and a power supply method that each use a high impedance battery used for electric equipment such as a notebook PC (notebook type personal computer).

2. Description of the Related Art

In regard to certain electric equipment, such as a mobile computing apparatus such as a notebook PC, it is strongly desired not only to have a thin and lightweight battery, but it also desired to have an enlarged battery capacity to lengthen the utility of such an apparatus. In such electric equipment, it is commonly known to utilize a secondary battery, such as a nickel-cadmium battery (NiCad battery), that can be charged and recharged many times by repeating the process of charging and discharging. However, recently, lithium ion batteries having high energy density are now being broadly used.

The lithium ion battery is also useable as a secondary battery that is made to have improved safety and to be able to perform repeated charging and discharging. The lithium ion battery has an energy density per unit weight nearly two times as high as that of a NiCad battery and a longer life. In addition, the lithium ion battery has many advantages over NiCad batteries such as, for example, not having a memory effect.

On the other hand, as a secondary battery for electric equipment that is anticipated to be widespread, there exists a lithium polymer battery. A lithium ion battery utilizes liquid electrolyte, but in the lithium polymer battery, a solid resin (polymer) is used, and hence the polymer provides further improved safety features over traditional battery sources and is also relatively thin. This lithium polymer battery is not common yet in terms of electrical characteristics and is also not yet readily available on a mass-production scale. Additionally, the lithium polymer battery has disadvantages that its internal resistance and impedance are relatively high. In a high impedance battery such as this lithium polymer battery, it is possible to have large capacity in the discharging of small current, but in the discharging of the large current, the battery voltage immediately drops to that of the final voltage of discharge. In consequence, for example, even if a lithium polymer battery is adopted in a notebook PC, since the lithium polymer battery has a superior volume capacitance ratio over that of the lithium ion battery, it is not possible to adequately use the capacity present. Thus, it is not possible to make full use of the features of a lithium polymer battery, such as that of the capability of large capacity.

SUMMARY OF THE INVENTION

The present invention has been achieved in order to solve such technical issues, and an object of the present invention is to make full use of the features of a battery having large capacity and high impedance.

In addition, another object of the present invention is to utilize a battery for a long period of time by effectively using a high impedance battery having large capacity.

For these objects, the present invention is configured so that a lithium polymer battery is utilized as a battery for electronic equipment, that is, in usual operation, electric power is supplied from the lithium polymer battery to a main body, and when current larger than a certain value is required, a predetermined amount of electric power is supplied from a main battery such as a lithium ion battery. Thus, a power supply apparatus of the present invention is characterized in that the power supply apparatus comprises: a first battery supplying electric power, and a second battery not only supplying electric power but also outputting the electric power in voltage in excess of that of the first battery, and that the power supply apparatus supplies the electric power from the second battery until the load power reaches a predetermined amount, and supplies electric power in excess of that available from the first battery alone when the load power exceeds the predetermined amount by supplying electric power from the first battery and the second battery in combination.

Here, the power supply apparatus can further comprise a current limiting circuit letting the second battery output electric power until load power reaches a predetermined amount and limiting current such that output voltage from the second battery may be dropped when the load power reaches a predetermined amount. Owing to this, it is possible to prevent a high impedance battery, represented by a lithium polymer battery, from discharging in large current, and hence it is possible to avoid the problem of the battery immediately reaching the final voltage of discharge.

In addition, it is preferable from the viewpoint of being able to continue battery operation to make it a feature to completely replace the second battery with the first battery after using up the second battery, and to supply electric power by this first battery. Furthermore, it is possible to suppress heat generation from the battery.

Moreover, a power supply apparatus of the present invention, in a preferred embodiment, comprises: a first battery supplying electric power, a second battery that supplies electric power by being connected to the first battery in parallel, which outputs electric power in voltage higher than the first battery, and is a battery comprised of, for example, a lithium polymer battery having high internal impedance, and a rectifier circuit such as a diode preventing flow of current from the second battery to the first battery. Here, where electric power is supplied from the second battery until the output voltage of the second battery with high internal impedance drops to an output voltage level based on the first battery by the increase of output current, and electric power is supplied by the first battery and the second battery after the output voltage of the second battery dropped to the voltage level based on this first battery, it becomes possible to also supply electric power to the main body whose load becomes high.

Further, it becomes possible by the present invention to deal with the problem where the battery voltage of the second battery with high internal impedance sharply drops and reaches the final voltage of discharge. Here, "voltage level based on the first battery" is the voltage, which is obtained by subtracting forward voltage in a rectifier circuit, or the like not to be limited to the voltage that is just outputted from the first battery, and means a voltage level corresponding to an output of the second battery when the first battery is connected in parallel.

In addition, the first battery and/or the second battery can be any one of a primary battery that cannot be charged, or a secondary battery that can be charged and discharged.

Additionally, a power supply apparatus of the present invention, in a preferred embodiment, comprises: a first battery and a second battery that supply electric power and can be used many times by repeating charging and discharging; and a current limiting circuit that supplies electric power from the second battery in normal use if a battery with high impedance is connected as the second battery, and that limits an output from the second battery when current exceeding a certain value is required. Here, the current limiting circuit operates with a specific signal where when a lithium polymer battery is connected as the second battery, this current limiting circuit is preferable in terms of being able to drive the current limiting circuit by distinguishing a case that a battery with high impedance is connected.

Further, the power supply apparatus, in a preferred embodiment, provides electric power equal to an amount exceeding an output from the second battery is supplied from the first battery when an output from the second battery is limited by this current limiting circuit.

On the other hand, electric equipment to which the present invention is applied comprises: a main battery supplying electric power to a main body; and a lithium polymer battery supplying electric power by being connected to the main body, and supplying voltage higher than an output voltage range of the main battery, and that the electric equipment supplies electric power from the lithium polymer battery if the load power of the main body is within a predetermined amount, and supplies load power equal to an amount, exceeding a predetermined amount, by the main battery when the load power of the main body exceeds the predetermined amount. By using such a configuration, in general, it is possible to effectively use a lithium polymer battery, which has a large capacity but a high impedance, by making use of its intrinsic characteristics. In particular, this preferred embodiment provides an adequate and efficient use of a lithium polymer battery in electric equipment such a mobile computing apparatus (i.e., a notebook PC) for which thinning is required.

In addition, in order to achieve the objectives of the present invention, the present invention provides an electric power supply method for supplying electric power from a first battery and a second battery with high impedance, wherein the electric power supply method comprises the steps of: outputting the electric power in voltage higher than an output voltage range of the first battery from the second battery; supplying the electric power from the second battery when a necessary current value is not larger than an predetermined amount; and supplying the electric power from the first battery and the second battery when the necessary current value exceeds the predetermined amount. The predetermined amount may be, for example, an allowable current value for making the second battery not reach the final voltage of discharge, or may be defined as a current value when the voltage of the second battery reaches an output voltage range of the first battery due to the voltage drop of the second battery caused by, for example, impedance.

Further, this method may further comprise the further step of performing control lest current larger than a certain amount should be flown from the second battery positively when this load power exceeds this predetermined amount.

In another preferred embodiment, the present invention is an electric power supply method for supplying electric power to electric equipment comprising the steps of: recognizing that a battery with large capacity and high impedance is connected to the electrical equipment; supplying electric power from the battery recognized when load power by the electric equipment is not larger than a predetermined amount; and limiting output current by dropping the output voltage of the battery when the load power by the electric equipment exceeds the predetermined amount. Furthermore, the electric power supply method may further comprise the step of supplying electric power, which is equal to an amount exceeding the electric power of the battery, from another battery when the load power by this electric equipment exceeds a predetermined amount.

BRIEF DESCRIPTION OF THE DRAWINGS

FIG. 1 is an explanatory diagram of a configuration of a power supply apparatus in a preferred embodiment.

FIG. 2 is a block diagram showing a schematic configuration of an AC adapter detecting circuit.

FIG. 3 is a block diagram showing a schematic configuration of a current limiting circuit.

FIG. 4 is a chart showing an output waveform of the current limiting circuit.

FIG. 5 is a diagram showing a schematic configuration of a power supply apparatus in another preferred embodiment.

FIG. 6 is a chart showing output characteristics in a preferred embodiment.

DETAILED DESCRIPTION OF THE INVENTION

FIG. 1 is an explanatory diagram of the configuration of a power supply apparatus for a preferred embodiment. This power supply apparatus is connected to electric equipment such as a notebook PC to supply electric power for this electric equipment, and generally, is provided inside the electric equipment. This power supply apparatus comprises a lithium polymer battery 11 as a second battery, a lithium ion battery 12 as a main battery, and an AC adapter 13 that is connected to an AC power supply. Both of the lithium polymer battery 11 and lithium ion battery 12 are secondary batteries that can be charged and discharged repeatedly. There may be such an aspect that this second battery (lithium polymer battery 11) is connected to a main body of an apparatus by being separately installed outside the notebook PC as well as, for example, being inserted after detaching a floppy disk drive or a CD-ROM drive of the notebook PC. In addition, the lithium ion battery 12 as the main battery compensates for an output of the lithium polymer battery 11 at the time of heavy load, which is a feature of this embodiment, and is used as a main power supply after making full use of the lithium polymer battery 11.

In addition, a system broadly comprises an AC adapter detecting circuit 20, a current limiting circuit 30, and a charging battery switching circuit 40. This charging battery switching circuit 40 comprises a first FET (Field Effect Transistor) 41 having an N channel, a second FET 42, and FET drive circuits 43 and 44 that are drive circuits driving these FETs. In addition, the system further comprises a circuit 51, and a charging circuit 52 that is used for charging the lithium polymer battery 11 and lithium ion battery 12. Furthermore, the system comprises a third FET 53 having an N channel, an FET drive circuit 54 driving this third FET 53, a DC/DC converter 55, and a system load 56. This system load 56 means parts consuming electricity and corresponds to internal electronic circuits and LSIs in a main body of equipment, a hard disk drive (HDD), or the like. Moreover, the DC/DC converter 55 functions so as to supply voltages to the system load 56 as a voltage converting circuit by converting voltage into 5V for the HDD, 3.3 V for the LSIs, or the like, for example, if the voltage of 16 V is supplied.

The FET drive circuits 43 and 44 constituting the charging battery switching circuit 40 and the FET drive circuit 54 are controlled by a controller 50. This controller 50 controls the on/off of the first FET 41, second FET 42, and third FET 53 at the time of charging of each battery. In this embodiment, when charging the lithium ion battery 12 that is the main battery, the first FET 41 is turned on, and the second FET 42 and third FET 53 are turned off. In addition, this controller 50 performs controls so that, at the time of charging the lithium polymer battery 11 that is the second battery, the second FET 42 is turned on, and the first FET 41 and third FET 53 are turned off.

In addition, as described above, it is assumed that a main battery is the lithium ion battery 12 and the second battery is the lithium polymer battery 11, but it is also envisioned by the invention herein that a lithium ion battery or the like except the lithium polymer battery 11 is connected as the second battery. For the purpose, in this embodiment, a lithium polymer signal is prepared so as to distinguish between these. This lithium polymer signal is configured so that this polymer signal becomes a "low" level when the lithium polymer battery is used and become a "high" level when the other battery is used. In addition, a current control circuit 30 is connected to an electric power line of the lithium polymer battery 11, and the on/off of the current limiting circuit 30 is controlled by a battery signal from the AC adapter detecting circuit 20 and the lithium polymer signal from the lithium polymer battery 11.

FIG. 2 is a block diagram showing the schematic configuration of the AC adapter detection circuit 20. The AC adapter detecting circuit 20 in this embodiment are composed of a voltage detector 21, a reference voltage 22, and a voltage comparator 23. Here, for example, let the maximum output voltage of the lithium ion battery 12 be 12.6 V (an output voltage of the battery varies between 9.0 V and 12.6 V), let an output voltage of the current limiting circuit 30, connected to a power supply line of the lithium polymer battery 11 be 14.0 V, and let the voltage of an AC adapter 13 be 20 V. In such a case, in the AC adapter detecting circuit 20, for example, reference voltage 22 is set so that the output voltage of the voltage detector 21 and the reference voltage 22 become equal when the power supply line of the AC adapter 13 is 17 V. First, in the voltage detector 21, the output voltage of the AC adapter 13 is detected. The output of this voltage detector 21 is compared with the reference voltage 22 that is set to detect, for example, 17 V. If voltage higher than the battery voltage appears in the power supply line of the AC adapter 13, it is sure that the AC adapter 13 is connected, and hence if the output of the voltage detector 21 is higher than this reference voltage 22 (for example, more than 17 V), a "high" level is output in the battery signal. On the other hand, this is configured so that, if the output of the voltage detector 21 is lower than this reference voltage 22 (e.g. less than 17 V), a "low" level is outputted in the battery signal. Thus, when the AC adapter detecting circuit 20 connects to the AC adapter 13, the battery signal is made to be a "high" level, and is made a "low" level at the time of only the battery. Owing to this, this embodiment is configured so that, if the second battery is the lithium polymer battery 12 and does not connect to the AC adapter 13, both inputs of the circuit 51 become "low-low", and hence the current control circuit 30 becomes on.

FIG. 3 is a block diagram showing the schematic configuration of the current limiting circuit 30. The current control circuit 30 consists of an output controller 31, a constant voltage controller 32, and a constant current controller 33. The constant voltage controller 32 detects the output voltage of the current limiting circuit 30, and controls the output controller 31 so that output voltage becomes constant. The constant current controller 33 detects output current, and controls the output controller 31 not to flow current larger than a certain value when load becomes large, and controls the output controller 31 so that output voltage droops.

FIG. 4 is a chart showing an output waveform of the current limiting circuit 30. This current limiting circuit 30 is a voltage regulation circuit having a drooping characteristic. In this circuit portion, it is possible also to have an input current limiting circuit (not shown) so as not to exceed an allowable current value of the lithium polymer battery 11. Nevertheless, if it is clear not to exceed the allowable current value from output characteristics of the current limiting circuit 30, it is not necessary to have the input current limiting circuit. The output voltage $V_{out}$ is set at voltage a little higher than the output voltage of the lithium ion battery 12 that is a main battery. Owing to this characteristic, this embodiment is configured so that, if load power of the main body is within ($V_{out} \times I_{max}$), electric power is supplied only from the lithium polymer battery 11, and if the load power exceeds ($V_{out} \times I_{max}$), deficient electric power is supplied from the lithium ion battery 12. When this system is in battery operation, the controller 50 performs control so that the first FET 41 of the charging battery switching circuit 40 becomes off and the second FET 42 becomes on. Although this system can operate even if the first FET 41 is on, the lithium polymer battery 11 improperly charges the lithium ion battery 12 when the electric power of the main body is smaller than ($V_{out} \times I_{max}$). Hence, so as not to charge the battery, the first FET 41 is made to be off.

On the other hand, if the current limiting circuit 30 operates (on) when the lithium polymer battery 11 is charged by connecting the AC adapter 13, it is not possible to normally charge the lithium polymer battery 11. For this reason, in this embodiment, as described above, when the AC adapter detecting circuit 20 detects that the AC adapter 13 is connected, the current limiting circuit 30 is turned off by making a battery signal be "high". When the current limiting circuit 30 becomes off, a source of the lithium polymer battery 11 and the second FET 42 are connected electrically. Therefore, it becomes possible to charge the lithium polymer battery 11 similarly to a usual battery.

In this manner, in this preferred embodiment, it is premised that the main battery (lithium ion battery 12) has sufficient capacity. However, in consideration of the power dissipation of the main body, battery capacity, or the like, it is possible to use up the lithium polymer battery 11 so long as the capacity of the main battery is more than nearly 30% of the full capacity. By performing controls to charge the main battery first, the second battery (lithium polymer battery 11) is charged after the main battery was charged. Therefore, it is possible to premise that the main battery has the capacity of 100% when this system start to operate by the battery. However, even if it is assumed that an empty main battery is connected in the worst case, it is possible to effectively use the lithium polymer battery 11 by using this system by charging the main battery for nearly 15 minutes.

In this manner, in this first embodiment, the current limiting circuit 30 is provided, usually, electric power is outputted in voltage higher than an output voltage range of the lithium ion battery 12 from the lithium polymer battery 11, and when large current (more than $I_{max}$) flows, an output of the current limiting circuit 30 connected to the lithium polymer battery 11 is made to be drooped. In addition, this embodiment is configured so that, in large current, electric power from the lithium ion battery 12 treats this situation. Owing to this, even if a high impedance battery like the lithium polymer battery 11 that the voltage of the battery immediately reaches the final voltage of discharge at the time of discharging in large current is used, it becomes possible to use up the capacity.

In the first preferred embodiment, as described above, the example of providing the current limiting circuit 30 as the voltage regulation circuit having a dropping characteristic is described. In a second preferred embodiment, described following, a most simplified example without this current limiting circuit 30 is discussed.

FIG. 5 is a diagram showing the schematic configuration of a power supply apparatus in a second embodiment. A power supply apparatus in this embodiment comprises a lithium polymer battery 71 and a lithium ion battery 72 that are mutually connected in parallel, and a diode 73 that is provided as a rectifier circuit in an output side of the lithium ion battery 72. Here, there is no current limiting circuit 30 used in the first embodiment. In addition, charging also is not performed in a main body of the power supply apparatus, but the charging of a battery, for example, is performed by an external battery charger. Thus, it shows a case that the power supply apparatus in the second embodiment performs just the discharging of a battery. Furthermore, it is not necessary to always limit the battery to a secondary battery, but this embodiment can be also applied to a primary battery that cannot be charged. This lithium polymer battery 71 is a battery with high impedance, and in this embodiment, its maximum output voltage is set to be higher than that of the lithium ion battery 72.

FIG. 6 is a chart showing output characteristics in the second embodiment. The output voltage $V_{out1}$ is the voltage obtained by subtracting the forward voltage of diode 73 from the output voltage of the lithium ion battery 72. In this embodiment, a peak output current value of the lithium polymer battery 71 is made to be, for example, 3 A. At the time of output current equal to or less than this value 3 A, only the lithium polymer battery 71 supplies electric power. The lithium polymer battery 71 is a battery with high impedance, and as shown in FIG. 6, voltage drop caused by the battery impedance occurs with increase of the output current. In consequence, when the output current exceeds 3 A, the lithium ion battery 72 also starts to supply electric power in addition to the lithium polymer battery 71. In this manner, in this embodiment, in simple configuration, it is possible to supply electric power from the lithium polymer battery 71 with high impedance in usual battery operation, and to supply insufficient electric power from the lithium ion battery 72 when the current equal to or larger than a certain value is required. Owing to this, it is possible to solve the problem that, since battery voltage suddenly drops to reach the final voltage of discharge, operation cannot be performed.

In this manner, according to the present invention, it becomes possible to supply electric power to electric equipment over a long time by making full use of characteristics for a battery with high impedance in spite of large capacity.

What is claimed is:

1. A power supply apparatus, comprising:
   a first battery supplying electric power; and
   a second battery supplying electric power and outputting the electric power at a voltage higher than that of the first battery,
   wherein the apparatus supplies the electric power from the second battery until load power reaches a predetermined level, and thereafter supplies electric power by the first battery and the second battery when the load power exceeds the predetermined level.

2. The apparatus according to claim 1, comprising a current limiting circuit for letting the second battery output electric power until load power reaches the predetermined level and letting output voltage from the second battery be dropped when the load power reaches the predetermined level.

3. The apparatus according to claim 1, wherein the second battery is a lithium polymer battery.

4. The apparatus according to claim 1, wherein electric power is supplied by the first battery after using up the second battery.

5. A power supply apparatus, comprising:
   a first battery supplying electric power;
   a second battery that supplies electric power by being connected to the first battery in parallel, outputs electric power in voltage higher than that of the first battery, and has high internal impedance; and
   a circuit preventing flow of current from the second battery to said first battery.

6. The apparatus according to claim 5, wherein electric power is supplied from the second battery until output voltage of the second battery drops to an output voltage level, based on the first battery, due to increase of output current, and after the drop of the voltage level based on the first battery, the power supply apparatus supplies electric power by the first battery and the second battery.

7. The apparatus according to claim 5, wherein the first battery and/or the second battery are a primary battery or a secondary battery.

8. A power supply apparatus, comprising:
   a first battery and a second battery that supply electric power and can be used many times by repeating charging and discharging; and
   a current limiting circuit that supplies electric power from the second battery in normal use if a battery with high impedance is connected as the second battery, and that limits an output from the second battery when current equal to or larger than a certain value is required.

9. The apparatus according to claim 8, wherein the current limiting circuit operates if a lithium polymer battery is connected as the second battery.

10. The apparatus according to claim 8, wherein electric power equal to an amount exceeding an output from the second battery is supplied from the first battery when the output from the second battery is limited by the current limiting circuit.

11. Electric equipment, comprising:
    a main battery supplying electric power to a main body; and
    a lithium polymer battery supplying electric power by being connected to the main body, and supplying voltage higher than an output voltage range of the main battery,
    wherein the electric equipment supplies electric power from the lithium polymer battery if load power of the main body is within a predetermined amount, and supplies load power equal to an amount, exceeding a predetermined amount, by the main battery if the load power of the main body exceeds the predetermined amount.

12. An electric power supply method for supplying electric power from a first battery and a second battery with high impedance, comprising the steps of:

outputting the electric power in voltage higher than an output voltage range of the first battery from the second battery;

supplying the electric power from the second battery when a necessary current value is not larger than an predetermined amount; and supplying the electric power from the first battery and the second battery when the necessary current value exceeds the predetermined amount.

13. The method according to claim 12, comprising the further step of performing control lest current, which is not less than a certain value, should flow from the second battery when load power exceeds the predetermined amount.

14. An electric power supply method for supplying electric power to electric equipment, comprising the steps of:

recognizing that a battery with large capacity and high impedance is connected to the electrical equipment;

supplying electric power from the battery recognized if load power by the electric equipment is not larger than a predetermined amount; and limiting output current by dropping output voltage of the battery if load power by the electric equipment exceeds the predetermined amount.

15. The method according to claim 14, comprising the further step of supplying electric power equal to an amount exceeding electric power of the battery when load power by the electric equipment exceeds a predetermined amount.

* * * * *